(12) United States Patent
Zirr et al.

(10) Patent No.: US 12,322,558 B2
(45) Date of Patent: Jun. 3, 2025

(54) KEY STRUCTURE WITH LIGHT-GUIDING FUNCTION

(71) Applicant: Voyetra Turtle Beach, Inc., White Plains, NY (US)

(72) Inventors: Kristian Zirr, Hamburg (DE); Wei Chuan Wang, New Taipei (TW)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

(21) Appl. No.: 18/559,601

(22) PCT Filed: May 4, 2022

(86) PCT No.: PCT/US2022/027601
§ 371 (c)(1),
(2) Date: Nov. 8, 2023

(87) PCT Pub. No.: WO2022/240628
PCT Pub. Date: Nov. 17, 2022

(65) Prior Publication Data
US 2024/0379302 A1    Nov. 14, 2024

(30) Foreign Application Priority Data

May 10, 2021   (TW) ................................ 110205250
May 19, 2021   (CN) .......................... 202121072850.4

(51) Int. Cl.
*H01H 13/02*     (2006.01)
*F21V 8/00*      (2006.01)

(52) U.S. Cl.
CPC ......... *H01H 13/023* (2013.01); *G02B 6/0068* (2013.01); *H01H 2013/026* (2013.01); *H01H 2219/062* (2013.01)

(58) Field of Classification Search
CPC .......... H01H 13/023; H01H 2013/026; H01H 2219/062; G02B 6/0068
See application file for complete search history.

(56) References Cited

U.S. PATENT DOCUMENTS 9,728,350 B2 *   8/2017   Müller ................ H01H 13/023
10,916,387 B2    2/2021   Dietz
(Continued)

FOREIGN PATENT DOCUMENTS

CN    110383411       10/2019
CN    215496495 U     1/2022
TW    M609309 U       3/2021

*Primary Examiner* — Mary Ellen Bowman
(74) *Attorney, Agent, or Firm* — Sheppard Mullin Richter & Hampton LLP (57) ABSTRACT

In some implementations, a key structure may include a lower shell fixedly connected to a keyboard base. In addition, the device may include an upper shell assembled above the lower shell, where the upper shell is made of transparent plastic material, the upper shell is provided with having a through opening. The device may include a plurality of light guide columns extending downwardly from two sides of the bottom of the upper shell, where the plurality of light guide columns and the plurality of light-emitting sources are arranged opposite to each other. Moreover, the device may include a pressing shaft movably disposed between the lower shell and the upper shell, where a top end of the pressing shaft penetrates through the opening. Also, the device may include a spring disposed and elastically supported between the lower shell and the pressing shaft.

16 Claims, 6 Drawing Sheets

(56) References Cited

U.S. PATENT DOCUMENTS

| | | |
|---|---|---|
| 2014/0224631 A1 | 8/2014 | Hanaoka |
| 2016/0071662 A1* | 3/2016 | Cai .................... H01H 13/023 200/341 |
| 2020/0043680 A1 | 2/2020 | Ruff |

* cited by examiner

KEY STRUCTURE WITH LIGHT-GUIDING FUNCTION

CROSS-REFERENCE TO RELATED APPLICATIONS

This application is a National Phase application under 35 U.S.C. § 371 of PCT Application No. PCT/US2022/027601, filed May 4, 2022, which application claims the benefit of Chinese Patent Application No. 202121072850.4, filed May 19, 2021 (which issued as Chinese Patent No. ZL 202121072850.4 on Jan. 11, 2022), and Taiwan Patent Application No. 110205250, filed May 10, 2021 (which issued as Taiwan Patent No. M618906 on Nov. 1, 2021), which are hereby incorporated herein by reference in their entirety.

TECHNICAL FIELD

The present disclosure relates to a key structure, and in particular to a key structure with a light guide function.

BACKGROUND

As e-sports games become more popular and widespread, players' requirements for video game equipment specifications have also increased, leading to the emergence of a mechanical keyboard on the market. This mechanical keyboard has mechanical keys with long pressing strokes, precise touch and pressing feel, and long service life.

A traditional mechanical key comprises an upper shell, a lower shell, a pressing shaft, a spring, and a cap. The upper shell and the lower shell are assembled with each other and a cavity is formed inside them. The pressing shaft and the spring are accommodated in the cavity. A top end of the pressing shaft is exposed on the upper shell, the spring is elastically supported between a bottom end of the pressing shaft and the lower shell, and the cap is installed on the top end of the pressing shaft.

However, when the above mechanical keys are required to emit light, the upper shell is made of light-transmitting plastic material, so that the light source installed on the keyboard can guide light to the cap by means of the upper shell. However, how to make the upper shell have the functions of uniformly guiding light and guiding light for multiple light sources and other functions is one of the key points of the key industry.

BRIEF SUMMARY

Embodiments of the present invention provide a key structure with a light guide function, which utilizes light from each light source to be guided to opposite sides of the upper shell by means of each light guide column, so as to achieve a key structure having the effects of uniformly guiding light and guiding light for multiple light sources.

One embodiment of the present invention provides a key structure with a light guide function, which is used for a keyboard base and several light-emitting sources installed on the keyboard base, wherein the key structure comprises: a lower shell fixedly connected to the keyboard base; an upper shell assembled above the lower shell, wherein the upper shell is made of transparent plastic material, the upper shell is provided with a through opening and several light guide columns extend downwardly from two sides of the bottom of the upper shell, and the light guide columns and the light-emitting sources are arranged opposite to each other; a pressing shaft movably sandwiched between the lower shell and the upper shell, wherein a top end of the pressing shaft penetrates through the through opening; and a spring sandwiched and elastically supported between the lower shell and the pressing shaft.

In some embodiments, the upper shell has a top wall and an annular peripheral wall surrounding a peripheral edge of the top wall, and the several light guide columns are each molded to extend downwardly from two sides of the bottom of the annular peripheral wall.

In some embodiments, the upper shell has a top wall and an annular peripheral wall surrounding a peripheral edge of the top wall, and the several light guide columns are each molded to extend downwardly from the top wall and two sides of the bottom of the annular peripheral wall.

In some embodiments, the through opening is provided and molded from the top wall.

In some embodiments, a positioning stopper abutting against the lower shell protrudes from an inner side of each of the light guide columns.

In some embodiments, the number of light guide columns is two, each of the positioning stoppers is provided with a limiting groove, two limiting blocks protrude from two outer sides of the pressing shaft, and the limiting blocks are accommodated in the limit grooves and can be slidably moved therein.

In some embodiments, the key structure further comprises a cap, and the cap is assembled on the top of the pressing shaft and follows the pressing shaft to rise or fall.

In some embodiments, the cap has several light-transmitting marks, and the several light-transmitting marks and the light guide columns are arranged opposite to each other.

In some embodiments, the annular peripheral wall has a square shape, the annular peripheral wall has a pair of first opposite sides and a pair of second opposite sides, and the several light guide columns are formed at the bottom of the pair of first opposite sides.

In some embodiments, two clamping hooks extend downwardly from the bottom of the pair of second opposite sides, the lower shell is provided with two clamping slots and two clamping blocks arranged inside the clamping slots extend from the lower shell, and the clamping slots are engaged with the clamping slots and are mutually latched with the clamping blocks.

In some embodiments, the key structure further comprises a cap, the cap is assembled on the top of the pressing shaft, the cap has several light-transmitting marks, the light guide columns of the upper shell and the light-emitting sources are arranged opposite to each other, the several light-transmitting marks and the several light guide columns are also arranged opposite to each other, and the light from the light-emitting sources is guided to opposite sides of the upper shell by means of the light guide columns. As a result, the upper shell presents a visual perception of uniform brightness, and the light-emitting sources can be different in color, so that the several light-transmitting marks can also present a visual perception of different colors, so as to achieve the key structure having the effects of uniformly guiding light, guiding light for multiple light sources, and presenting marks of different colors.

10: key structure; 1: lower shell; 11: clamping slot; 12: clamping block; 2: upper shell; 21: top wall; 211: through opening; 22: annular peripheral wall; 224: clamping hook; 23: light guide column; 231: positioning stopper; 232: limiting groove; 3: pressing shaft; 31: limiting block; 4: spring; 5: cap; 51: light-transmitting mark; 100: keyboard base; 200: light-emitting source.

DETAILED DESCRIPTION

The detailed description and technical content of embodiments of the present invention will be described below in conjunction with the accompanying drawings. However, the accompanying drawings are only for illustrative purposes and are not used to limit the present invention.

Referring to FIGS. 1 to 6, embodiments provide a key structure with a light guide function. This key structure 10 mainly comprises a lower shell 1, an upper shell 2, a pressing shaft 3, and a spring 4.

Figure 1:
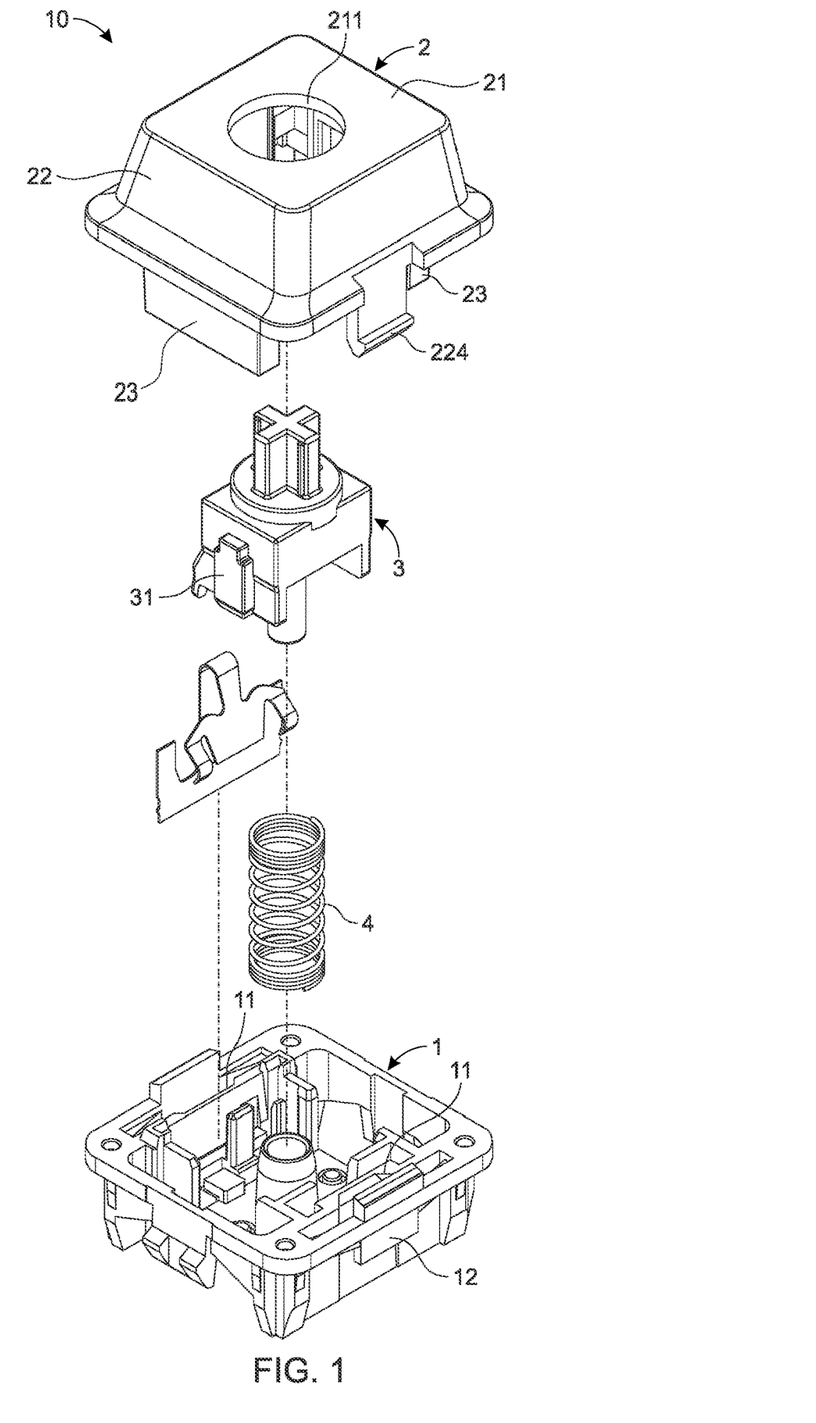
FIG. 1 is a perspective exploded view of a key structure.
Figure 2:
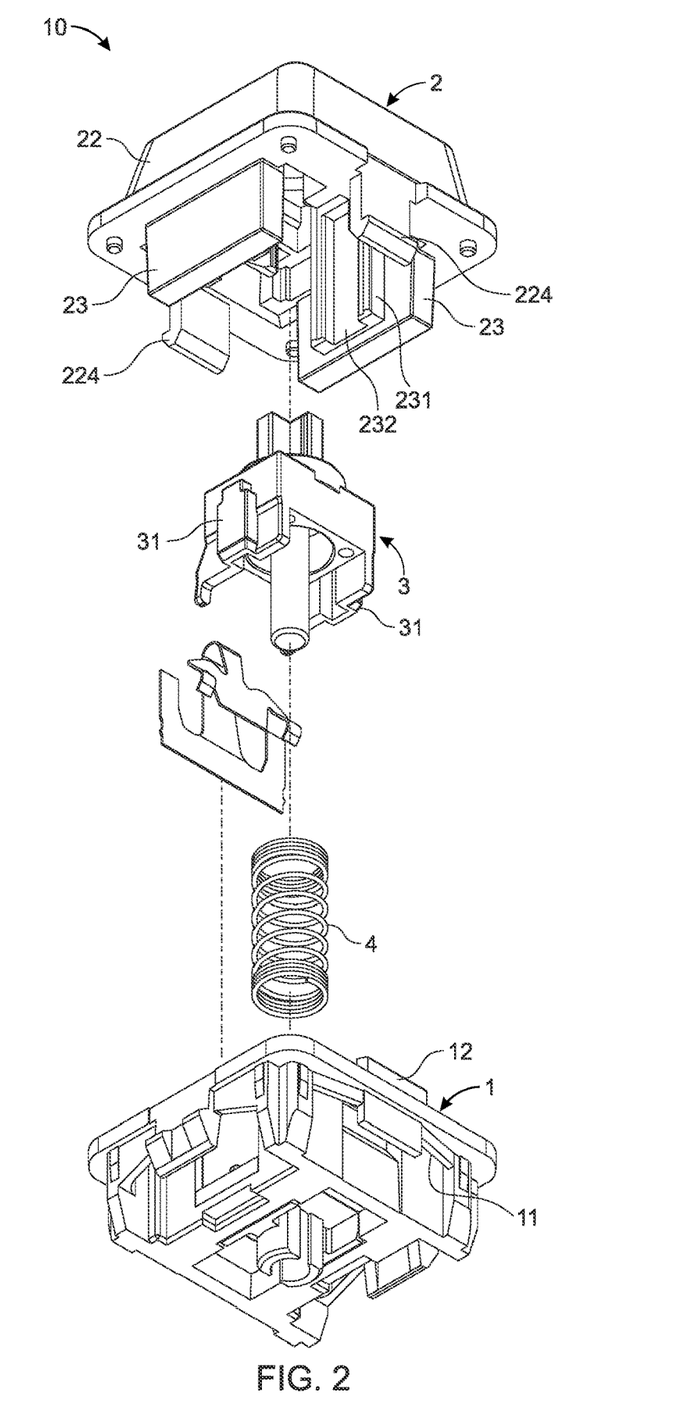
FIG. 2 is another perspective exploded view of the key structure.
Figure 3:
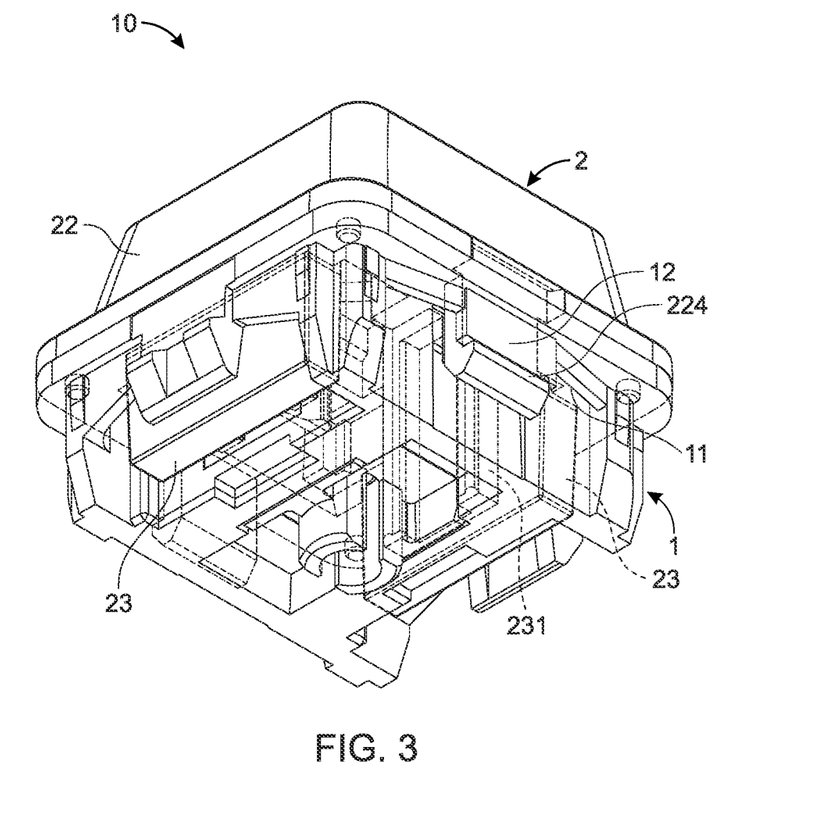
FIG. 3 is a perspective assembly view of the key structure.
Figure 4:
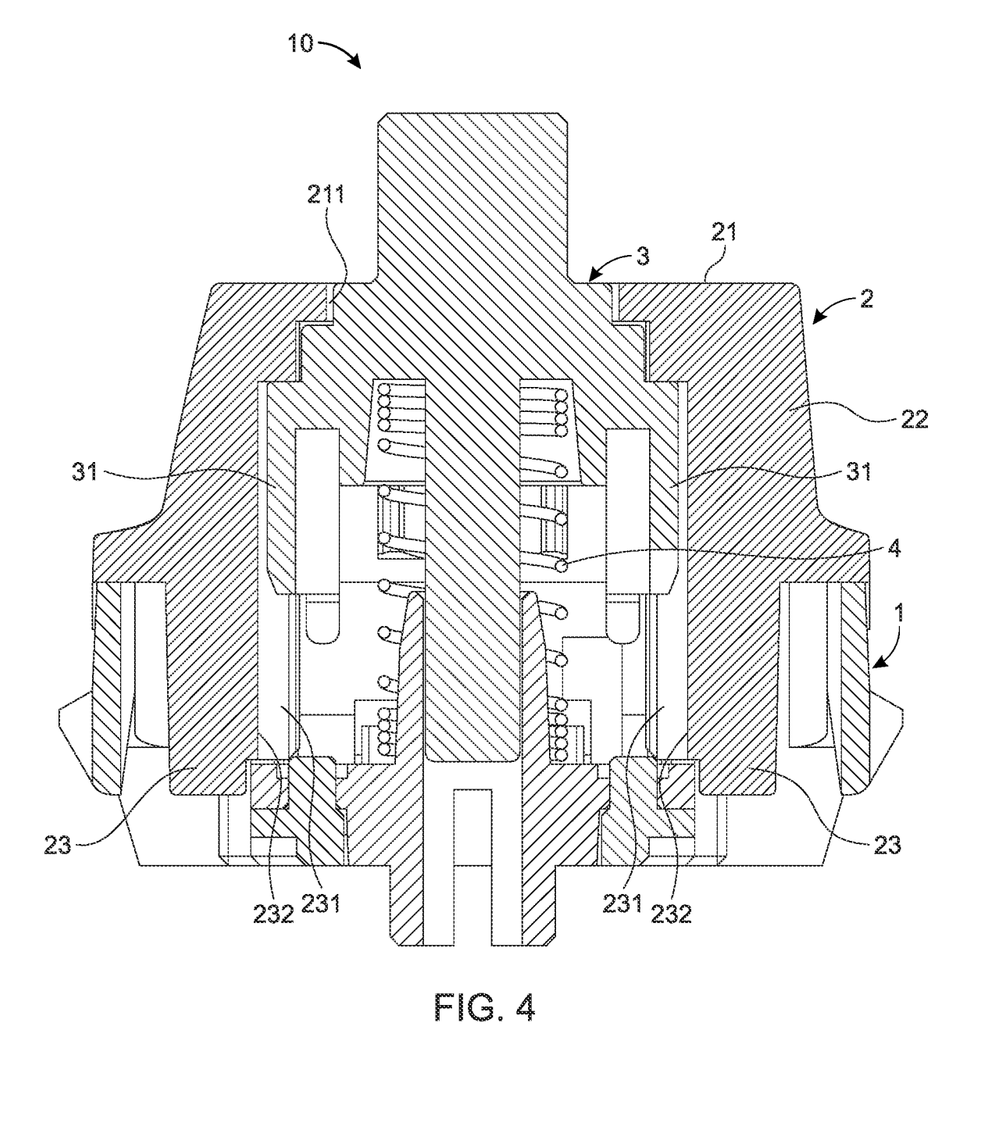
FIG. 4 is a cross-sectional assembly view of the key structure.
Figure 5:
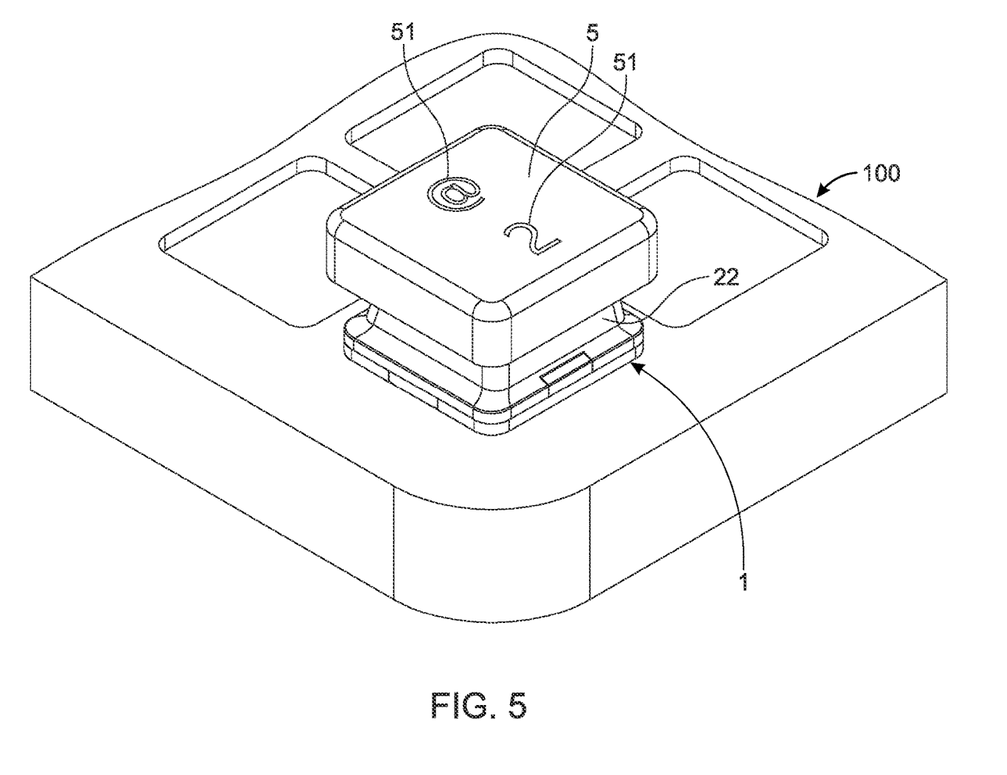
FIG. 5 is a perspective view of the key structure in a use state.
Figure 6:
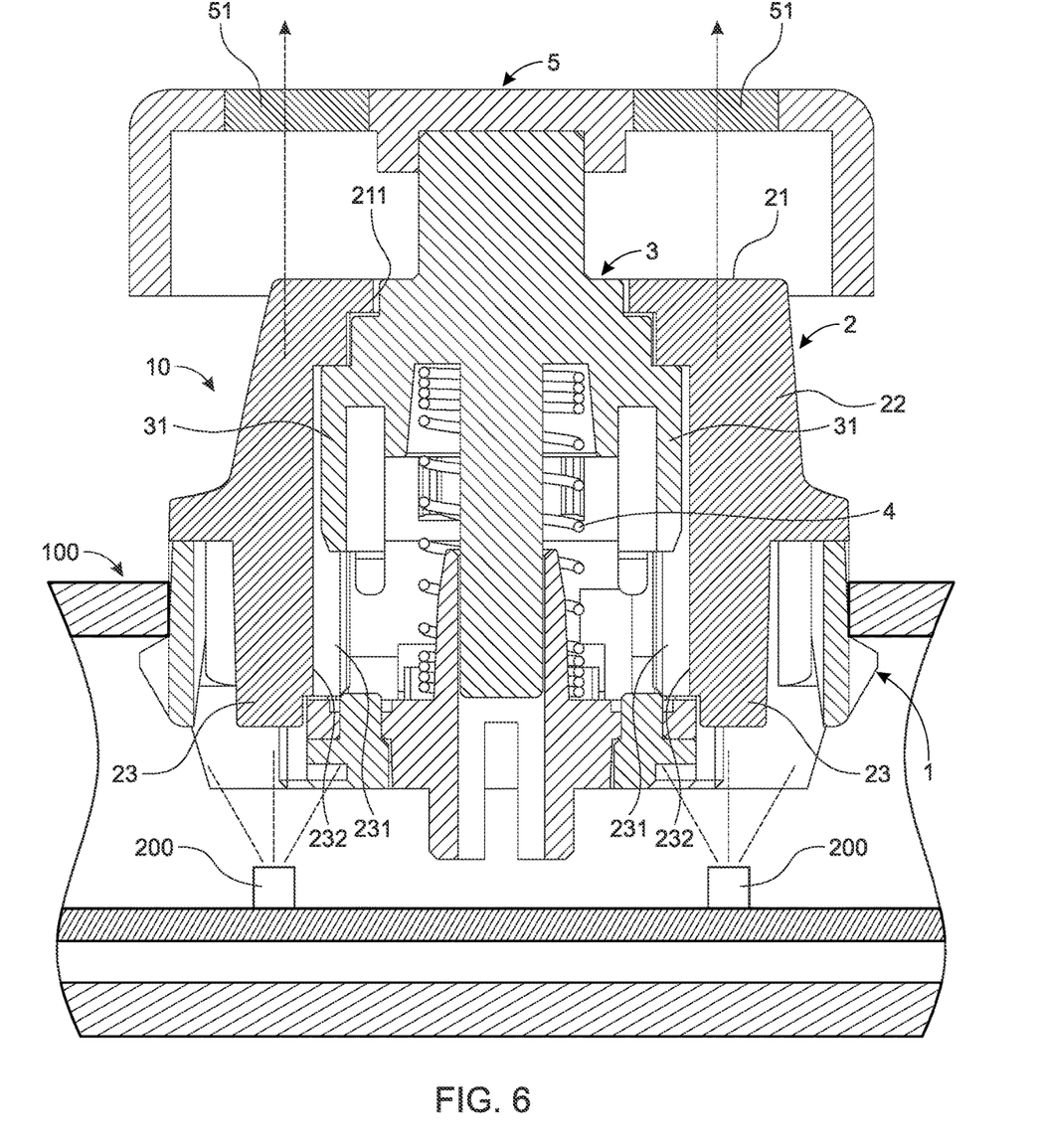
FIG. 6 is a cross-sectional view of the key structure in the use state.

As shown in FIGS. 5 to 6, the key structure 10 may be used for a keyboard base 100 and several light-emitting sources 200 installed on the keyboard base 100. Each light-emitting source 200 in this embodiment is a light-emitting diode (LED), but it is not limited thereto.

As shown in FIGS. 1 to 6, the lower shell 1 is fixedly connected above the keyboard base 100, the lower shell 1 is provided with two clamping slots 11, and two clamping locks 12 provided inside the clamping slots 11 extend from the lower shell 1.

As shown in FIGS. 1 to 6, the upper shell 2 is assembled above the lower shell 1. The upper shell 2 is made of transparent plastic material. The upper shell 2 is provided with a through opening 211, and several light guide columns 23 extend downwardly from two sides of the bottom of the upper shell 2. The light guide columns 23 and the light-emitting sources 200 are arranged opposite to each other.

The upper shell 2 has a top wall 21 and an annular peripheral wall 22 surrounding a peripheral edge of the top wall 21, and a through opening 211 is provided and molded from the top wall 21. The several light guide columns 23 of this embodiment are each molded by extending downwardly from the top wall 21 and two sides of the bottom of the annular peripheral wall 22, but they are not limited to this. The several light guide columns 23 may also each be molded by extending downwardly only from two sides of the bottom of the annular peripheral wall 22.

In addition, a positioning stopper 231 abutting against the lower shell 1 protrudes from an inner side of each light guide column 23, and the number of light guide columns 23 in this embodiment is two. Each positioning stopper 231 is provided with a limiting groove 232.

Further, the annular peripheral wall 22 of this embodiment has a square shape. The annular peripheral wall 22 has a pair of first opposite sides and a pair of second opposite sides. The several light guide columns 23 are formed at the bottom of this pair of first opposite sides, and two clamping hooks 224 extend downwardly from the bottom of this pair of second opposite sides. The clamping hooks 224 are engaged with the clamping slots 11 and mutually latched with the clamping blocks 12, so that the lower shell 1 and the upper shell 2 are firmly assembled up and down.

As shown in FIGS. 1 to 4 and 6, the pressing shaft 3 is movably sandwiched between the lower shell 1 and the upper shell 2. A top end of the pressing shaft 3 penetrates the through opening 211. Two limiting blocks 31 protrude from two outer sides of the pressing shaft 3. The limiting blocks 31 are accommodated in the limiting grooves 232 and can be slidably moved therein.

As shown in FIGS. 1 to 4 and 6, the spring 4 is sandwiched and elastically supported between the lower shell 1 and the pressing shaft 3. The spring 4 of this embodiment is a coil spring, but it is not limited to this.

As shown in FIGS. 5 to 6, the key structure 10 further comprises a cap 5. The cap 5 is assembled on the top of the pressing shaft 3, and the cap 5 follows the pressing shaft 3 to rise or fall. The cap 5 has several light-transmitting marks 51, and the several light-transmitting marks 51 and the several light guide columns 23 are arranged opposite to each other.

As shown in FIGS. 5 to 6, in the use states of the key structure 10, the several light guide columns 23 extend from two opposite sides of the upper shell 2, the light guide columns 23 and the light-emitting sources 200 are arranged opposite to each other, the several light-transmitting marks 51 and the several light guide columns 23 are arranged opposite to each other, and the light of the light-emitting sources 200 is guided to two opposite sides of the upper shell 2 by means of the light guide columns 23. As a result, the upper shell 2 presents a visual perception of uniform brightness, and the light-emitting sources 200 can be different in color, so that the several light-transmitting marks 51 can also present a visual perception of different colors, so as to achieve the key structure 100 having the effects of uniformly guiding light, guiding light for multiple light sources, and presenting marks of different colors.

In summary, the key structure with the light guide function can indeed achieve the intended purpose of use and solve the defects of the prior art, and has industrial applicability. Moreover, the embodiments described above are only preferred embodiments for sufficiently explaining the disclosed embodiments, and the scope of protection is not limited thereto. The equivalent substitutions or transformations made by a person skilled in the art on the basis of the present disclosure are all within the scope of protection of the present invention.

The invention claimed is:

1. A key structure for a keyboard base and a plurality of light-emitting sources installed on the keyboard base, the key structure comprising:
   a lower shell fixedly connected to the keyboard base;
   an upper shell assembled above the lower shell, wherein the upper shell is made of transparent plastic material, the upper shell comprising a through opening, wherein the upper shell comprises a top wall and an annular peripheral wall at least partially surrounding a peripheral edge of the top wall, and wherein the plurality of light guide columns are each molded to extend downwardly from two sides of the bottom of the annular peripheral wall;
   a plurality of light guide columns extending downwardly from two sides of the upper shell, wherein the plurality of light guide columns and the plurality of light-emitting sources are arranged opposite to each other;

a pressing shaft movably disposed between the lower shell and the upper shell, wherein a top end of the pressing shaft penetrates through the through opening; and a spring disposed and elastically supported between the lower shell and the pressing shaft.

2. The key structure according to claim 1, wherein the upper shell comprises a top wall and an annular peripheral wall at least partially surrounding a peripheral edge of the top wall, and further wherein the plurality of light guide columns are each molded to extend downwardly from the top wall and two sides of the bottom of the annular peripheral wall.

3. The key structure according to claim 1, wherein the through opening is provided and molded from the top wall.

4. The key structure according to claim 1, wherein a positioning stopper abutting against the lower shell protrudes from an inner side of each of the light plurality of guide columns.

5. The key structure according to claim 4, wherein the quantity of light guide columns is two, each of the positioning stopper is provided with a limiting groove, two limiting blocks protrude from two outer sides of the pressing shaft, and the limiting blocks are accommodated in the limit grooves and can be slidably moved therein.

6. The key structure according to claim 1, wherein the key structure further comprises a cap, and the cap is assembled on top of the pressing shaft and follows the pressing shaft to rise or fall.

7. The key structure according to claim 6, wherein the cap has several light-transmitting marks, and the several light-transmitting marks and the plurality of light guide columns are arranged opposite to each other.

8. The key structure according to claim 1, wherein the annular peripheral wall comprises a square shape, the annular peripheral wall comprises a pair of first opposite sides and a pair of second opposite sides, and the plurality of light guide columns are formed at the bottom of the pair of first opposite sides.

9. The key structure according to claim 8, wherein two clamping hooks extend downwardly from the bottom of the pair of second opposite sides, the lower shell is provided with two clamping slots and two clamping blocks arranged inside the clamping slots extend from the lower shell, and the clamping slots are engaged with the clamping slots and are mutually latched with the two clamping blocks.

10. The key structure according to claim 2, wherein the through opening is provided and molded from the top wall.

11. The key structure according to claim 2, wherein a positioning stopper abutting against the lower shell protrudes from an inner side of each of the light plurality of guide columns.

12. The key structure according to claim 4, wherein the quantity of light guide columns is two, each of the positioning stopper is provided with a limiting groove, two limiting blocks protrude from two outer sides of the pressing shaft, and the limiting blocks are accommodated in the limit grooves and can be slidably moved therein.

13. The key structure according to claim 2, wherein the key structure further comprises a cap, and the cap is assembled on top of the pressing shaft and follows the pressing shaft to rise or fall.

14. The key structure according to claim 6, wherein the cap has several light-transmitting marks, and the several light-transmitting marks and the plurality of light guide columns are arranged opposite to each other.

15. The key structure according to claim 2, wherein the annular peripheral wall comprises a square shape, the annular peripheral wall comprises a pair of first opposite sides and a pair of second opposite sides, and the plurality of light guide columns are formed at the bottom of the pair of first opposite sides.

16. The key structure according to claim 8, wherein two clamping hooks extend downwardly from the bottom of the pair of second opposite sides, the lower shell is provided with two clamping slots and two clamping blocks arranged inside the clamping slots extend from the lower shell, and the clamping slots are engaged with the clamping slots and are mutually latched with the two clamping blocks.

* * * * *